Figure 1:
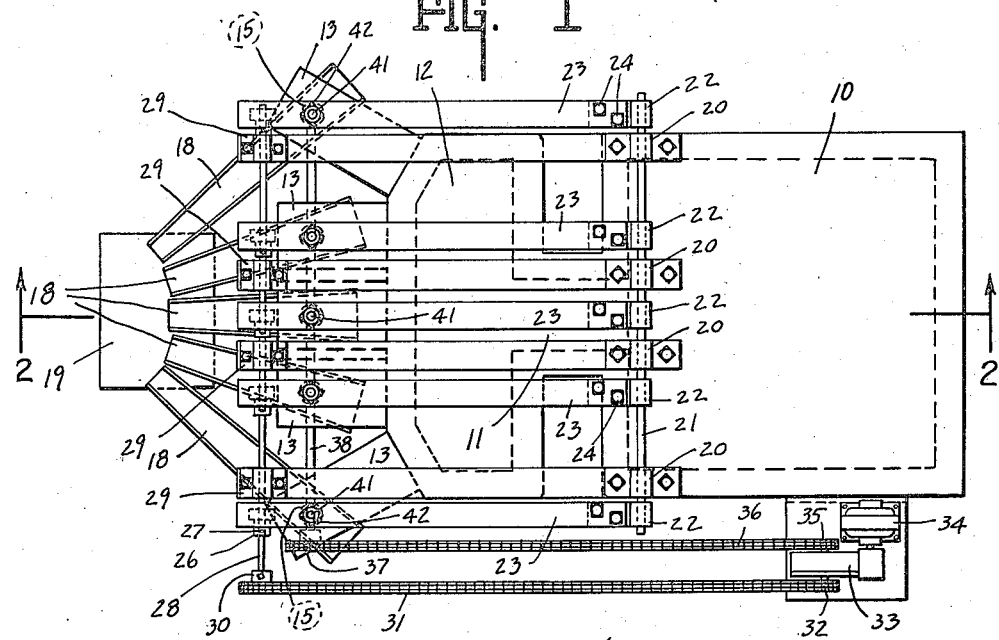

June 20, 1939.   A. C. CRIMMEL   2,162,800

METHOD AND APPARATUS FOR FORMING LARGE MASS GLASSWARE BY GOB DROPPING

Original Filed Jan. 24, 1935

INVENTOR.
ALVIE C. CRIMMEL.
BY Lockwood Goldsmith & Galt
ATTORNEYS.

Patented June 20, 1939

2,162,800

UNITED STATES PATENT OFFICE 2,162,800

METHOD AND APPARATUS FOR FORMING LARGE MASS GLASSWARE BY GOB DROPPING

Alvie C. Crimmel, Hartford City, Ind.

Application January 24, 1935, Serial No. 3,205
Renewed December 17, 1937

12 Claims. (Cl. 49—55)

This invention relates to an apparatus for forming large mass glassware.

The chief object of the invention is to form large mass glassware by apparatus which does not require the use of suction, which heretofore has been necessary.

Glassware has been blown, molded, or molded and blown from the mass of glass supplied to the mold.

At the present time, in the commercial manufacture of large mass glassware, such as carboys, large deep trays or glass boxes, such as battery jars for standby service, the same have been formed by the well known suction process, using apparatus employing suction, which process supplies liquid glass in the appropriate amount.

At the present time substantially all the small mass glassware is formed by the gravity discharge of a gob of glass of sufficient size to form the article when completed.

The practical limit of the gob thus handled has been about six to six and one-half pounds, and at the present time no instance is known of wherein a gob of more than eight pounds has ever been commercially formed and utilized, because after the eight pound limit has been reached, the additional amount of glass added introduces other difficulties that are not present or if originally present, are in a non-objectionable degree in the smaller gobs.

Carboys, battery jars, as well as deep trays require anywhere from over eight to fifteen pounds of glass. For rough service, each of these articles, merely cited by way of example, must have no less than a minimum thickness of side wall and bottom, hence, the large mass.

The suction process and the suction machines are each expensive, so that the unit cost of forming articles of the before said character, is proportionately relatively high compared to still larger articles, such as glass cylinders, and the like, formed by the suction process, or similar glass articles, such as bottles, and the like, formed with the automatic single gob forming apparatus.

In other words, there is a "twilight zone" wherein heretofore it has been unknown to produce at a relatively low cost articles of the semi-massive character indicated.

The chief feature of the invention consists in the solution of this problem by the supplying to a receiving mold, whether it be a press mold, blown mold or blank mold, as required for the formation of the intermediate or final product desired, a plurality of automatically formed gobs, such that the total mass of the gobs is in suitable condition in the mold for forming the desired article, whether it be the finished or intermediate product.

The present invention, therefore, contemplates the supplying of a plurality of gobs to a single mold in such timed relation that the gobs are in workable condition for subsequent article formation.

Briefly, the apparatus may be described as forming simultaneously or in timed sequence, separated by a very slight interval insufficient to permit the first gob formed to cool beyond the working condition by the last gob formed, and the supplying of a plurality of gobs to the single mold, either simultaneously in parallel relation or in successive relation substantially simultaneously or the several gobs in both relationships, last mentioned, said gobs being formed individually as well as automatically.

The apparatus includes a single melting tank provided with the usual throat discharging to the refining tank, the latter being provided with a plurality of fore-hearths in the desired number, each provided with a discharge orifice and equipped with means for forming the gob which may be by the application of pressure and the use of cutoff mechanism or, as illustrated herein, by the use of an independent plunger in each fore-hearth and a shears, both being aligned relative to the orifice. The glass discharged from the orifice and in gob formation is suitably and mechanically transported to the mold and herein such transference is accomplished by an inclined chute which may or may not be of heated character. In certain instances the several chutes are of equal length. In other instances, they are of unequal length.

If it is desired to have the independent gobs discharged to the mold simultaneously and the chutes are of dissimilar length, then the gobs are formed in timed relation, that is, the one falling into the longer chute is formed a sufficient interval previous to the one falling into the shorter chute, so that both gobs discharge to the mold simultaneously.

When it is desired to have the gobs discharge in succession to the mold and relatively one after the other or in approximate contact and the chutes are of dissimilar length and dissimilar inclinations, then timing of the formation of the gobs must be adjusted such that the several gobs will arrive in successive substantially contacting arrangement at the mold.

The present invention, therefore, provides for supplying to the mold a relatively large mass of glass in suitable condition for working and of more than eight pounds, and said mass is formed by the substantially simultaneous but independent automatic formation of a plurality of gobs mechanically transported and discharged to a single mold in the desired position in the mold and in the desired time sequence or simultaneously, so that the entire mass is in a workable condition.

The full nature of the invention will be understood from the accompanying drawing and the following description and claims:

Mechanism suitable for practicing the process or method herein before set forth, is illustrated herein and in the several figures, Fig. 1 represents a diagrammatic top plan view of a single tank provided with a plurality of fore hearths, each provided with a relatively independent plunger controlling an orifice and each provided with a shears, the gob automatically formed thereby discharging to a relatively independent conveyor, each conveyor discharging to the same mold.

Figure 2:
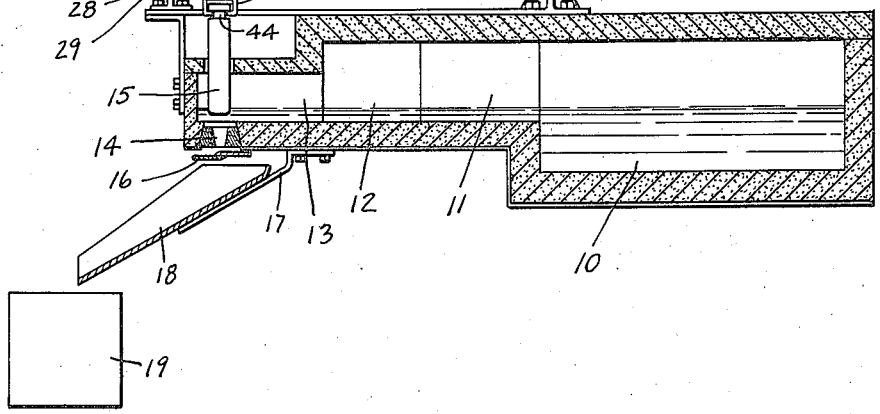

Fig. 2 is a diagrammatic, central sectional view of the apparatus shown in Fig. 1, taken on line 2—2 of Fig. 1, and in the direction of the arrows.

Illustrative of apparatus suitable for practicing the process or method, is a tank having the melting portion 10, the throat portion 11, and the refining portion 12. The refining portion of the tank, in the present instance, includes a plurality of fore-hearths 13, each of which includes a discharge orifice 14 with which, in the present instance, is associated the plunger 15 which is vertically reciprocable. In place of said plunger, air pressure or the like may be employed.

The numeral 16 indicates a shear construction in registration with the orifice. Positioned therebeneath and herein supported by the tank structure or frame-work therefor as at 17, is a chute 18 which discharges to a mold 19. This receiving mold may be the pressing mold or a blank mold, depending upon whether the mass or glass therein is to be pressed in one operation or to be formed as a blank and then otherwise pressed or blown to the final form desired.

Suitably supported in bearings 20, is a shaft 21 which pivotally supports a plurality of encircling arms 22 having extensions 23 secured at one end thereto as at 24. The opposite end of each arm 23 bears on a cam 25 having a collar portion 26 and a set screw, or similar device, 27 adjustably mounts said cam on the shaft 28 rotatably supported in bearing brackets 29.

A sprocket 30 is also carried by the shaft and is driven by chain 31, in turn driven by the sprocket 32 driven by a reduction mechanism 33, in turn driven by the electric motor 34 or other suitable source of power. The reduction mechanism 33 also drives sprocket 35, in turn driving chain 36, in turn driving sprocket 37, which rotates shaft 38, from which each of the shears 16 derives power. The power take-off (not shown for clearness) from said shaft 38 to each of said shears, is of an adjustable character, so that the several shears 16, while all subject to the same power source for operation, may be operated simultaneously or in timed relation, as desired or required. Similarly, each of the plungers is operated from the same power source, either simultaneously or in timed relation and the usual relationship between plunger operation and its associated shear mechanism is retained in all instances.

The connection between each bar 23 and plunger 15 includes an opening 40 in the bar near its free end through which extends a bolt member 41 and a pair of nuts 42 adjustably clamps the bolt to the bar in the desired position. The bolt 41 terminates in the head embracing portion 43, the lower portions of which are seated in the groove 44 at the upper end of the plunger 15, said upper end being exposed outside of the fore-hearth. The position of the plunger relative to the bar 23 determines the size of the gob automatically formed at the fore-hearth.

The apparatus herein disclosed and as previously described, is capable of automatically forming a plurality of gobs of the desired weight and in the desired timed relation or simultaneously, and said gobs so independently formed are mechanically conveyed to the mold and are supplied thereto in simultaneous or timed relation, so that the entire mass in the mold is of the desired weight over eight pounds in a workable condition for subsequent pressing, blowing, or the like.

By the aforesaid invention, there is thus provided an apparatus for forming large mass glassware, wherein the mass is more than eight pounds.

The invention claimed is:

1. Apparatus for forming large mass glassware including in combination, tank means, a plurality of fore-hearths associated with said tank means, each adapted to form an independent gob, means associated with each of said fore-hearths for automatically forming such independent gob, and means for conveying each gob so automatically and independently formed to a single common mold cavity.

2. Apparatus of the character defined by claim 1, characterized by a plurality of said fore-hearths being positioned equidistant from the receiving mold cavity.

3. Apparatus of the character defined by claim 1, characterized by a plurality of fore-hearths being positioned at different distances from the receiving mold cavity.

4. Apparatus of the character defined by claim 1, characterized by certain of the fore-hearths being positioned equidistant from the mold and other of the fore-hearths being positioned at different distances from the mold cavity.

5. In the formation of large mass glassware, a method including mechanically forming a plurality of gobs, the forming of the gobs being characterized by the simultaneous formation of certain of the gobs, certain of the other gobs being formed subsequently to the first mentioned gob formation but prior to the elapse of the shortest cooling interval of any one of the gobs to insure that all gobs are in workable condition at the same time subsequent to their formation, and mechanically transporting said gobs to a single cavity, gob receiving mold of at least eight pounds capacity, the total mass of glass when received by the mold cavity for single article formation being in workable condition.

6. In the formation of large mass glassware, a method including mechanically forming a plurality of gobs, and mechanically transporting said gobs to a single cavity, gob receiving mold of at least eight pounds capacity, the total mass of glass when received by the mold cavity for single article formation being in workable condition, the discharge of the respective gobs into the single mold cavity occurring substantially simultaneously to insure that all gobs are in workable condition, the greatest duration of transportation of any gob being less than the shortest cooling interval of any gob from formation to non-workable condition.

7. In the formation of large mass glassware, a method including mechanically forming a plurality of gobs, and mechanically transporting said gobs to a single cavity, gob receiving mold of at least eight pounds capacity, the total mass of glass when received by the mold cavity being in workable condition, the discharge of certain gobs into the single mold cavity occurring substantially simultaneously to insure all gobs are in workable condition, the duration of gob transportation being less than the shortest cooling interval of any certain gob from formation to non-workable condition, the discharge of certain of the gobs into the single mold cavity occurring at the conclusion of the gob transportation interval, for the first mentioned gobs and subsequent to the discharge to the cavity of still other gobs, all of the second and third mentioned discharges occurring during the shortest cooling interval from formation to non-workable condition of any one of the gobs and before the unworkable condition occurs, whereby the entire mass in the single cavity mold will be in a workable condition.

8. Apparatus of the character defined by claim 1, characterized by a plurality of said fore-hearths being positioned equidistant from the receiving mold cavity and certain of the gob forming means including an adjustable operating arrangement whereby gob formations occur successively but in relatively close sequence.

9. Apparatus of the character defined by claim 1, characterized by a plurality of fore-hearths being positioned at different distances from the receiving mold cavity and certain of the gob forming means including an adjustable operating arrangement whereby gob formations occur simultaneously for successive discharge to the single cavity mold for single article formation.

10. Apparatus of the character defined by claim 1, characterized by the gob conveying means including a plurality of gob conveyors, each having operative association with a gob forming means for transference of a gob from the gob forming means to the single, common mold cavity, certain of said conveyors being of substantially equal length.

11. Apparatus for forming large mass glassware including in combination, a tank, a plurality of fore-hearths communicating with said tank, discharge means associated with each of said fore-hearths for automatically discharging independent gobs therefrom, a common mold cavity, means for conveying said gobs independently from said fore-hearths to said cavity, means for timing the operation of the gob discharge means of a certain number of said fore-hearths to discharge their gobs successively but in relatively close sequence, and means for timing the operation of the gob discharge means of the remaining fore-hearths to discharge the gobs therefrom simultaneously.

12. Apparatus for forming large mass glassware including in combination, a tank, a plurality of fore-hearths communicating with said tank, discharge means associated with each of said fore-hearths for automatically discharging independent gobs therefrom, a common mold cavity, means for conveying said gobs independently from said fore-hearths to said cavity, the arrangement of said conveying means being such that the time of travel of the gobs from a certain number of said fore-hearths to the mold cavity will be substantially the same, means for timing the operation of the gob discharge means of a certain number of said fore-hearths to discharge their gobs successively but in relatively close sequence, and means for timing the operation of the gob discharge means of the remaining fore-hearths to discharge the gobs therefrom simultaneously.

ALVIE C. CRIMMEL.